United States Patent
Oshio et al.

(10) Patent No.: US 10,041,796 B2
(45) Date of Patent: Aug. 7, 2018

(54) METHOD FOR INSPECTING PHYSICAL QUANTITY SENSOR AND METHOD FOR MANUFACTURING PHYSICAL QUANTITY SENSOR

(71) Applicant: Seiko Epson Corporation, Tokyo (JP)

(72) Inventors: Masahiro Oshio, Shiojiri (JP); Kenji Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 177 days.

(21) Appl. No.: 15/075,656

(22) Filed: Mar. 21, 2016

(65) Prior Publication Data

US 2016/0290828 A1    Oct. 6, 2016

(30) Foreign Application Priority Data

Apr. 1, 2015    (JP) .................................. 2015-074861

(51) Int. Cl.
| | | |
|---|---|---|
| *G01C 25/00* | (2006.01) | |
| *G01C 19/5719* | (2012.01) | |
| *G01C 19/5726* | (2012.01) | |
| *G01C 19/5776* | (2012.01) | |

(52) U.S. Cl.
CPC ..... *G01C 19/5719* (2013.01); *G01C 19/5726* (2013.01); *G01C 19/5776* (2013.01); *G01C 25/005* (2013.01)

(58) Field of Classification Search
CPC ............ G01C 19/5719; G01C 19/5726; G01C 19/5776; G01C 25/005
See application file for complete search history.

(56) References Cited

U.S. PATENT DOCUMENTS

| | | | | |
|---|---|---|---|---|
| 2004/0113647 A1* | 6/2004 | Deb | ..................... | B81C 99/005 324/750.3 |
| 2008/0190199 A1* | 8/2008 | Prandi | ................ | G01C 19/5726 73/504.12 |
| 2013/0233048 A1* | 9/2013 | Anac | .................... | G01C 25/005 73/1.77 |
| 2013/0263641 A1* | 10/2013 | Opris | ..................... | G01P 21/00 73/1.38 |
| 2014/0074418 A1* | 3/2014 | Lin | ......................... | G01P 21/00 702/96 |
| 2014/0290363 A1* | 10/2014 | Shindo | ..................... | G01P 3/14 73/514.15 |
| 2016/0169933 A1* | 6/2016 | Ohms | ................ | G01C 19/5705 73/1.37 |
| 2017/0314960 A1* | 11/2017 | Anac | .................... | G01C 25/005 |

FOREIGN PATENT DOCUMENTS

JP          2014-190941 A       10/2014

\* cited by examiner

*Primary Examiner* — Natalie Huls
(74) *Attorney, Agent, or Firm* — Oliff PLC (57) ABSTRACT

A method for inspecting a physical quantity sensor includes: applying a test drive signal while changing a voltage level, to an angular velocity sensor as a physical quantity sensor having a detection portion which performs detection vibration according to a physical quantity; detecting an output signal from the detection portion corresponding to the test drive signal, as a test detection signal; and performing pass/fail determination based on a change in the test detection signal in relation to the change in the voltage level.

16 Claims, 8 Drawing Sheets

METHOD FOR INSPECTING PHYSICAL QUANTITY SENSOR AND METHOD FOR MANUFACTURING PHYSICAL QUANTITY SENSOR

BACKGROUND

1. Technical Field

The present invention relates to a method for inspecting a physical quantity sensor and a method for manufacturing a physical quantity sensor.

2. Related Art

According to the related art, a method for inspecting a physical quantity sensor before shipping by a burn-in test is known, for example, as described in JP-A-2014-190941. In the method described in JP-A-2014-190941, a stress is applied to a sensor element by overdriving the sensor element in a high-temperature environment. The trouble of a sensor element with a defect such as a crack is thus increased, and changes in its electrical characteristics before and after the burn-in test are examined, so as to find the defective product.

However, in the inspection method described in JP-A-2014-190941, for example, the test needs to be conducted over several hours at the upper limit temperature of use and this makes the inspection time-consuming. Therefore, the problem of poor inspection efficiency arises.

SUMMARY

An advantage of some aspects of the invention is to solve at least a part of the problems described above, and the invention can be implemented as the following forms or application examples.

Application Example 1

A method for inspecting a physical quantity sensor according to this application example includes: applying a test drive signal while changing a voltage level, to a physical quantity detection element having a detection portion which performs detection vibration according to a physical quantity; detecting an output signal from the detection portion corresponding to the test drive signal, as a test detection signal; and performing pass/fail determination based on a change in the test detection signal in relation to the change in the voltage level.

According to this application example, since the pass/fail determination is performed on the basis of the change in the test detection signal in relation to the change in the voltage level of the test drive signal, inspection can be performed in a shorter time than in the case where the burn-in test is carried out. Therefore, a more efficient inspection method can be provided.

Application Example 2

In the method for inspecting the physical quantity sensor according to the above application example, it is preferable that the physical quantity detection element further includes a drive portion which performs drive vibration as the test drive signal is applied thereto, and that the test detection signal is a leakage signal outputted from the detection portion on the basis of the drive vibration of the drive portion.

According to this application example, since the test drive signal is applied to the drive portion and the leakage signal output from the detection portion is detected as the test detection signal, both of the drive portion and the detection portion can be inspected. Therefore, an even more efficient inspection method can be provided.

Application Example 3

In the method for inspecting the physical quantity sensor according to the above application example, it is preferable that the pass/fail determination is performed on the basis of a rate of change in voltage of the test detection signal in relation to the voltage level when the voltage level is raised from a first level to a second level that is higher than the first level.

According to this application example, since the pass/fail determination is performed on the basis of the rate of change in voltage of the test detection signal, a physical quantity sensor whose vibration state has turned abnormal because of, for example, the attachment of a foreign matter to the drive portion or the detection portion can be determined as a defective product. Therefore, an inspection method that enables pass/fail determination by a simple method can be provided.

Application Example 4

In the method for inspecting the physical quantity sensor according to the above application example, it is preferable that the voltage level is raised from a first level to a second level that is higher than the first level, that the voltage level is lowered from the second level to the first level, and that the pass/fail determination is performed on the basis of a difference between a voltage of the test detection signal when the voltage level rises from the first level and a voltage of the test detection signal when the voltage level has fallen to the first level.

According to this application example, since the pass/fail determination is performed on the basis of the difference between the voltage of the test detection signal when the rise in the voltage level is started and the voltage of the test detection signal when the fall in the voltage level has ended, a physical quantity sensor which has a defect such as a crack in the drive portion or the detection portion and can potentially become a defective product can be eliminated. Therefore, an inspection method which enables pass/fail determination by a simple method can be provided.

Application Example 5

In the method for inspecting the physical quantity sensor according to the above application example, it is preferable that the physical quantity sensor further includes a drive circuit which causes the drive portion to perform the drive vibration, and that the drive circuit generates the test drive signal on the basis of a variable external voltage inputted from outside.

According to this application example, since the test drive signal is generated on the basis of the variable external voltage inputted from outside, the effect of being able to freely set the value of the test drive signal to be applied can be achieved.

Application Example 6

In the method for inspecting the physical quantity sensor according to the above application example, it is preferable that the physical quantity sensor further includes a drive circuit which causes the drive portion to perform the drive vibration, that the drive circuit has a reference voltage circuit capable of generating n different kinds of reference voltages from a first reference voltage to an n-th reference voltage (n being an integer equal to or greater than 2), and that the voltage level of the test drive signal is based on the reference voltages.

According to this application example, since the voltage level of the test drive signal can be changed on the basis of the n kinds of reference voltages generated by the reference voltage circuit, an external input device is not needed and the effect of being able to perform inspection with a simple configuration can be achieved.

Application Example 7

A method for manufacturing a physical quantity sensor according to this application example includes an inspection process including: applying a test drive signal while changing a voltage level, to a physical quantity detection element having a detection portion which performs detection vibration according to a physical quantity; detecting an output signal from the detection portion corresponding to the test drive signal, as a test detection signal; and performing pass/fail determination based on a change in the test detection signal in relation to the change in the voltage level.

According to this application example, since the pass/fail determination is performed on the basis of the change in the test detection signal in relation to the change in the voltage level of the test drive signal, inspection can be performed in a shorter time than in the case where the burn-in test is carried out. Therefore, a more efficient manufacturing method can be provided.

Application Example 8

In the method for manufacturing the physical quantity sensor according to the above application example, it is preferable that the physical quantity detection element further includes a drive portion which performs drive vibration as the test drive signal is applied thereto, and that the test detection signal is a leakage signal outputted from the detection portion on the basis of the drive vibration of the drive portion.

According to this application example, since the test drive signal is applied to the drive portion and the leakage signal output from the detection portion is detected as the test detection signal, both of the drive portion and the detection portion can be inspected. Therefore, an even more efficient manufacturing method can be provided.

Application Example 9

In the method for manufacturing the physical quantity sensor according to the above application example, it is preferable that the pass/fail determination is performed on the basis of a rate of change in voltage of the test detection signal in relation to the voltage level when the voltage level is raised from a first level to a second level that is higher than the first level.

According to this application example, since the pass/fail determination is performed on the basis of the rate of change in voltage of the test detection signal, a physical quantity sensor whose vibration state has turned abnormal because of, for example, the attachment of a foreign matter to the drive portion or the detection portion can be determined as a defective product. Therefore, a manufacturing method in which the abnormality of the vibration state can be found out by a simple method can be provided.

Application Example 10

In the method for manufacturing the physical quantity sensor according to the above application example, it is preferable that the voltage level is raised from a first level to a second level that is higher than the first level, that the voltage level is lowered from the second level to the first level, and that the pass/fail determination is performed on the basis of a difference between a voltage of the test detection signal when the voltage level rises from the first level and a voltage of the test detection signal when the voltage level has fallen to the first level.

According to this application example, since the pass/fail determination is performed on the basis of the difference between the voltage of the test detection signal when the rise in the voltage level is started and the voltage of the test detection signal when the fall in the voltage level has ended, a physical quantity sensor which has a defect such as a crack in the drive portion or the detection portion and has a hysteresis in the change in test detection signal can be determined as a defective product. Therefore, a manufacturing method in which the abnormality of the drive portion or the detection portion can be found out by a simple method can be provided.

Application Example 11

In the method for manufacturing the physical quantity sensor according to the above application example, it is preferable that the physical quantity sensor further includes a drive circuit which causes the drive portion to perform the drive vibration, and that the drive circuit generates the test drive signal on the basis of a variable external voltage inputted from outside.

According to this application example, since the test drive signal is generated on the basis of the variable external voltage inputted from outside, the effect of being able to freely set the test drive signal to be applied can be achieved.

Application Example 12

In the method for manufacturing the physical quantity sensor according to the above application example, it is preferable that the physical quantity sensor further includes a drive circuit which causes the drive portion to perform the drive vibration, that the drive circuit has a reference voltage circuit capable of generating n different kinds of reference voltages from a first reference voltage to an n-th reference voltage (n being an integer equal to or greater than 2), and that the voltage level of the test drive signal is based on the reference voltages.

According to this application example, since the voltage level of the test drive signal can be changed on the basis of the n kinds of reference voltages generated by the reference voltage circuit, an external input device is not needed and the effect of being able to perform inspection with a simple configuration can be achieved.

BRIEF DESCRIPTION OF THE DRAWINGS

The invention will be described with reference to the accompanying drawings, wherein like numbers reference like elements.

FIGS. 4A to 4I show waveforms of a leakage signal in the detection circuit provided in the physical quantity sensor.

DESCRIPTION OF EXEMPLARY EMBODIMENTS

Hereinafter, embodiments of the invention will be described with reference to the drawings. In each of the drawings below, each layer or each member is not illustrated to scale, in order to show each layer or each member in a size large enough to be recognized.

Embodiment 1

Schematic Configuration of Physical Quantity Sensor

First, the schematic configuration of an angular velocity sensor 1 as a preferred example of a physical quantity sensor will be described. The angular velocity sensor 1 is a sensor which detects the angular velocity of rotation that is given.

Figure 1:
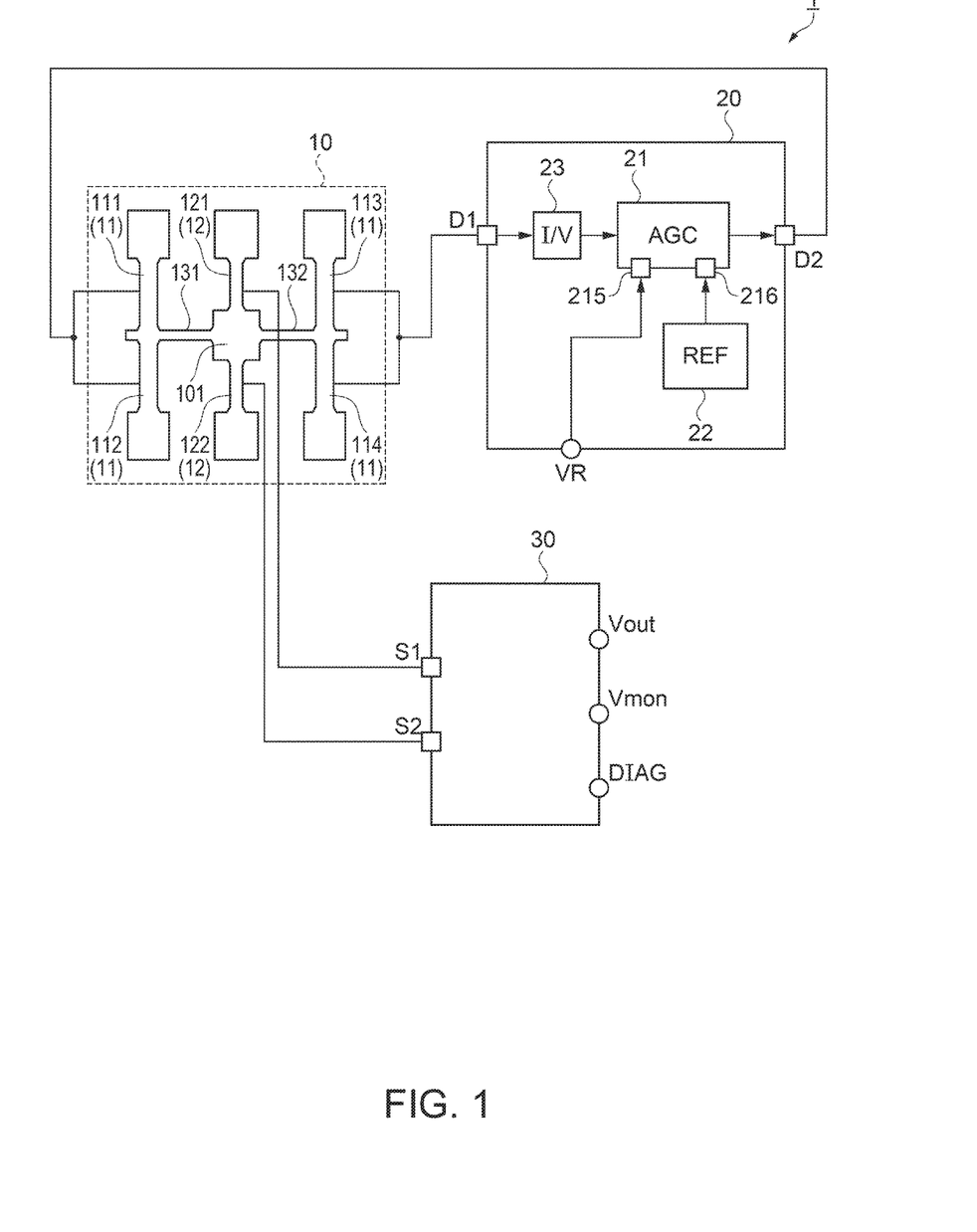
FIG. 1 is a schematic view of a physical quantity sensor.

FIG. 1 is a schematic diagram of the angular velocity sensor 1. The angular velocity sensor 1 includes an angular velocity detection element 10, a drive circuit 20, and a detection circuit 30 or the like.

The angular velocity detection element 10 performs detection vibration in response to a Coriolis force generated by rotation and outputs an electrical signal corresponding to this detection vibration. In a preferred example, the angular velocity detection element 10 is a so-called double-T-type vibrator and includes a base portion 101, a drive portion 11, a detection portion 12, a first connection arm 131, and a second connection arm 132 or the like. The angular velocity detection element 10 is made of quartz crystal ($SiO_2$ crystal).

The detection portion 12 has a first detection arm 121 and a second detection arm 122. The first detection arm 121 and the second detection arm 122 extend in the opposite directions to each other from the base portion 101.

The first connection arm 131 and the second connection arm 132 extend in the opposite directions to each other from the base portion 101, along directions intersecting with the directions in which the first detection arm 121 and the second detection arm 122 extend.

The drive portions 11 has a first drive arm 111, a second drive arm 112, a third drive arm 113, and a fourth drive arm 114. The first drive arm 111 and the second drive arm 112 extend in the opposite directions to each other from the first connection arm 131, along the directions in which the first detection arm 121 and the second detection arm 122 extend. The third drive arm 113 and the fourth drive arm 114 extend in the opposite directions to each other from the second connection arm 132, along the directions in which the first detection arm 121 and the second detection arm 122 extend.

The drive circuit 20 is a circuit which generates a drive signal and causes the angular velocity detection element 10 to perform drive vibration. The drive circuit 20 includes an AGC circuit 21, a reference voltage circuit 22, a current/voltage converter circuit 23, a first drive electrode D1, a second drive electrode D2, and an external terminal VR or the like.

The first drive electrode D1 is electrically connected to drive electrodes (not shown) provided on the first drive arm 111 to the fourth drive arm 114 forming the drive portion 11. When an oscillation start signal is inputted, the drive portion 11 starts drive vibration and an alternating current from the drive portion 11 is inputted to the first drive electrode D1. The inputted current is converted to a voltage signal by the current/voltage converter circuit 23 and then inputted to the AGC circuit 21. The AGC circuit 21 has an external voltage input electrode 215 which is electrically connected to the external terminal VR, and a reference voltage input electrode 216 which is electrically connected to the reference voltage circuit 22. The AGC circuit 21 generates a drive signal of a constant level on the basis of an external voltage Vex inputted from the external terminal VR or on the basis of a reference voltage VREF inputted from the reference voltage circuit 22, and outputs the drive signal to the second drive electrode D2. The second drive electrode D2 is electrically connected to drive electrodes (not shown) which are provided on the first drive arm 111 to the fourth drive arm 114 forming the drive portion 11 and which are different from the drive electrodes electrically connected to the first drive electrode D1, and outputs a signal of the reverse phase of the alternating current inputted to the first drive electrode D1. Thus, an oscillation loop is formed by the angular velocity detection element 10 and the drive circuit 20.

The angular velocity detection element 10 performs drive vibration in response to the drive signal from the drive circuit 20. Specifically, the first drive arm 111 and the third drive arm 113 perform flexural vibration of repeating movements toward and away from each other, and the second drive arm 112 and the fourth drive arm 114 perform flexural vibration of repeating movements toward and away from each other.

Now, when an angular velocity about an axis perpendicular to the drawing sheet is applied to the angular velocity sensor 1, a Coriolis force in a direction orthogonal to the drive vibration acts on the drive portion 11. Then, the first connection arm 131 and the second connection arm 132 start vibration along the directions in which the first drive arm 111 to the fourth drive arm 114 extend. With this, the detection portion 12 performs detection vibration. Specifically, the first detection arm 121 and the second detection arm 122 vibrate in directions intersecting with the first detection arm 121 and the second detection arm 122.

Meanwhile, when the angular velocity sensor 1 is still (when no angular velocity is applied), no Coriolis force is generated. Therefore, if the drive vibration of the drive portion 11 is perfectly symmetrical flexural vibration, the first detection arm 121 and the second detection arm 122 do not vibrate. However, in practice, since drive vibration is slightly asymmetrical, steady vibration occurs also in the first detection arm 121 and the second detection arm 122, linked with the drive vibration. Hereinafter, this vibration is referred to as leakage vibration, and the signal outputted from the detection portion 12 in response to the leakage vibration is referred to as a leakage signal.

The detection circuit 30 is a circuit which processes the alternating current from detection electrodes (not shown) provided on the first detection arm 121 and the second detection arm 122 forming the detection portion 12. The detection circuit 30 has a first detection electrode S1, a second detection electrode S2, an angular velocity signal output terminal Vout, a leakage signal output terminal Vmon, and a failure diagnosis signal output terminal DIAG or the like. The first detection electrode S1 is electrically connected to the detection electrode (not shown) provided on the first detection arm 121. The second detection electrode S2 is electrically connected to the detection electrode (not shown) which is provided on the second detection arm 122 and which outputs a signal of the reverse phase of the detection electrode electrically connected to the first detection electrode S1.

The angular velocity signal output terminal Vout outputs an angular velocity signal corresponding to the angular velocity on the basis of the signals inputted to the first detection electrode S1 and the second detection electrode S2. The leakage signal output terminal Vmon outputs the leakage signal described above. Also, if a failure such as damage to the angular velocity detection element 10 or disconnection of a wire or the like occurs when the angular velocity sensor 1 is in use, the detection circuit 30 generates a failure diagnosis signal and outputs the signal from the failure diagnosis signal output terminal DIAG.

Configuration and Operation of AGC Circuit 21

Figure 2:
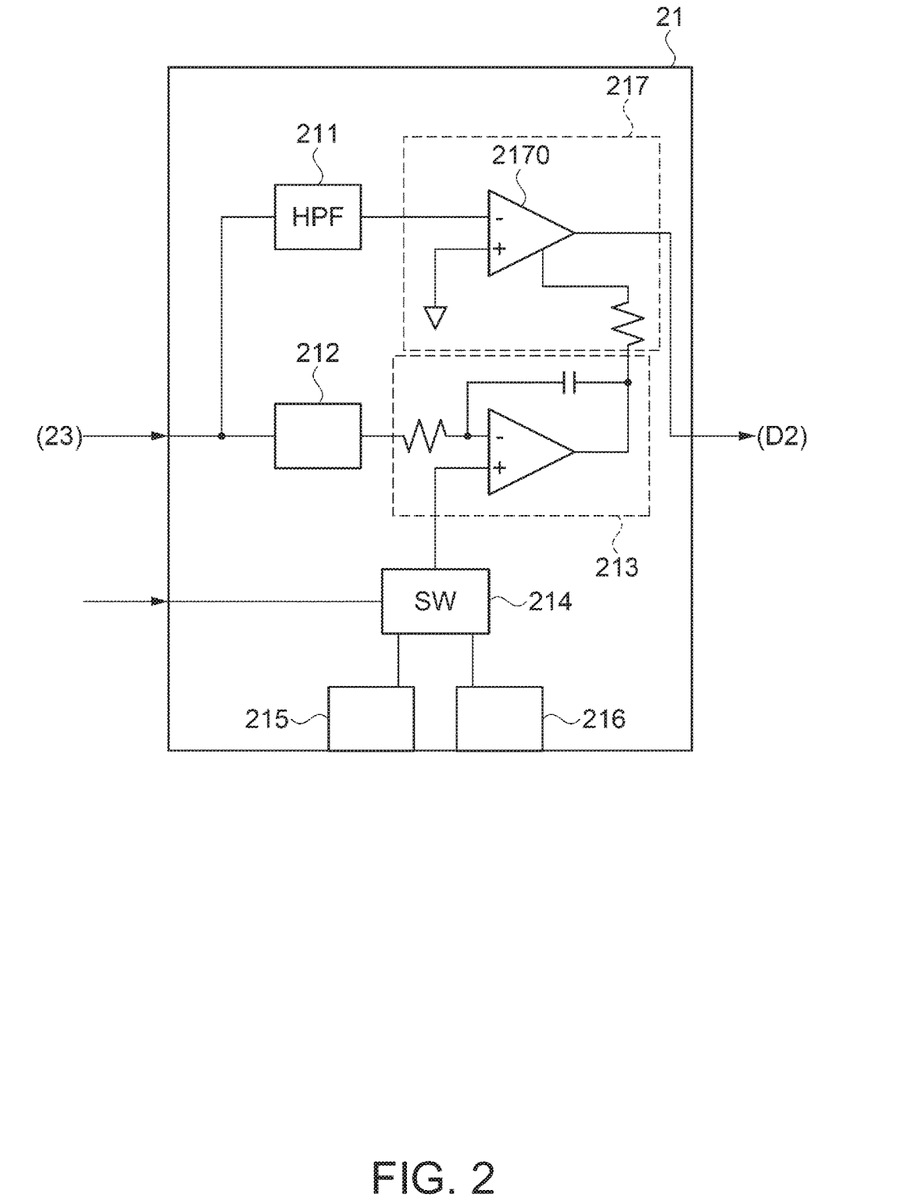
FIG. 2 is a circuit diagram of an AGC circuit provided in the physical quantity sensor.

FIG. 2 is a circuit diagram of the AGC circuit 21 provided in the drive circuit 20. The AGC circuit 21 includes a high-pass filter 211, a full-wave rectifier circuit 212, a comparator/adjustor circuit 213, a switching circuit 214, the external voltage input electrode 215, the reference voltage input electrode 216, and a drive signal generation circuit 217 or the like.

The signal from the current/voltage converter circuit 23 branches to be inputted to the high-pass filter 211 and the full-wave rectifier circuit 212.

The high-pass filter 211 reduces an offset voltage included in the output signal of the current/voltage converter circuit 23 and also performs the phase adjustment function in order for the drive circuit 20 and the angular velocity detection element 10 to form the oscillation loop. The output signal of the high-pass filter 211 is inputted to the drive signal generation circuit 217.

The full-wave rectifier circuit 212 performs full-wave rectification of the AC voltage signal inputted from the current/voltage converter circuit 23. The output signal of the full-wave rectifier circuit 212 is inputted to the comparator/adjustor circuit 213.

The switching circuit 214 inputs either the input signal from the external voltage input electrode 215 or the input signal from the reference voltage input electrode 216 to the comparator/adjustor circuit 213 on the basis of a switching circuit control signal applied from outside.

The comparator/adjustor circuit 213 integrates the difference between the signal from the full-wave rectifier circuit 212 and the signal from the switching circuit 214. Thus, a signal based on the comparison between the input signal from the current/voltage converter circuit 23 and the external voltage Vex or the reference voltage VREF is inputted to the drive signal generation circuit 217.

The drive signal generation circuit 217 has a comparator 2170 and thus compares the signal from the high-pass filter 211 with a reference and outputs a binarized signal as a square-wave drive signal. The output signal of the comparator/adjustor circuit 213 is inputted to the power-supply voltage of the comparator 2170. Thus, as the difference between a voltage level Vd from the current/voltage converter circuit 23 and the external voltage Vex or the reference voltage VREF is reflected on gain, the excitation current flowing through the drive portion 11 is maintained at a constant level based on the external voltage Vex or the reference voltage VREF.

Configuration of Detection Circuit

Figure 3:
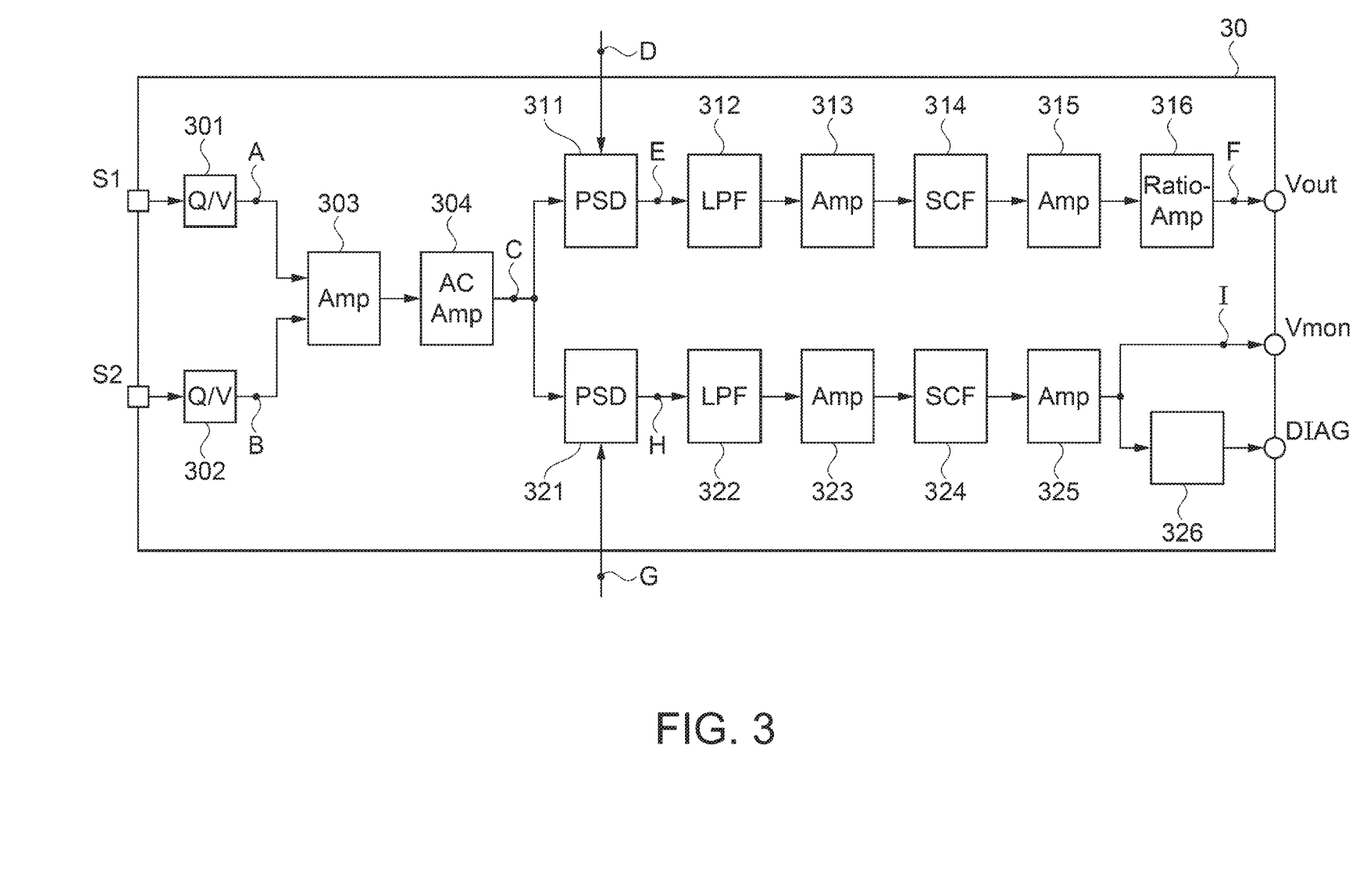
FIG. 3 is a circuit diagram of a detection circuit provided in the physical quantity sensor.

FIG. 3 is a circuit diagram of the detection circuit 30 provided in the angular velocity sensor 1.

The detection circuit 30 includes the first detection electrode S1, the second detection electrode S2, a first charge amplifier 301, a second charge amplifier 302, a differential amplifier circuit 303, an AC amplifier circuit 304, a first synchronous detection circuit 311, a first low-pass filter 312, a DC amplifier circuit 1-1 313, a first switched capacitor filter 314, a DC amplifier circuit 1-2 315, a ratiometric amplifier 316, a second synchronous detection circuit 321, a second low-pass filter 322, a DC amplifier circuit 2-1 323, a second switched capacitor filter 324, a DC amplifier circuit 2-2 325, a threshold circuit 326, the angular velocity signal output terminal Vout, the leakage signal output terminal Vmon, and the failure diagnosis signal output terminal DIAG or the like.

A current signal corresponding to the vibration of the first detection arm 121 is inputted to the first charge amplifier 301. The first charge amplifier 301 converts this current signal to a voltage signal. A current signal corresponding to the vibration of the second detection arm 122 is inputted to the second charge amplifier 302. The second charge amplifier 302 converts this current signal to a voltage signal. The differential amplifier circuit 303 differentially amplifies the signal from the first charge amplifier 301 and the signal from the second charge amplifier 302. The AC amplifier circuit 304 performs AC amplification of the signal from the differential amplifier circuit 303. The output signal from the AC amplifier circuit 304 is inputted to the first synchronous detection circuit 311 and the second synchronous detection circuit 321.

The first synchronous detection circuit 311 performs synchronous detection of the signal from the AC amplifier circuit 304 on the basis of a detection signal having a frequency equal to that of the drive signal and having a phase shifted substantially 90 degrees from that of the drive signal. The first low-pass filter 312 smoothes the signal from the first synchronous detection circuit 311 and also reduces the noise of the high-frequency component. The DC amplifier circuit 1-1 313 performs DC amplification of the output signal from the first low-pass filter 312. The first switched capacitor filter 314 further reduces the noise of the high-frequency component included in the output signal from the DC amplifier circuit 1-1 313 and limits the frequency band of the output signal.

The DC amplifier circuit 1-2 315 amplifies the output signal from the first switched capacitor filter 314 and decides the ultimate gain. The ratiometric amplifier 316 performs the function of preventing the output signal from the detection circuit 30 from varying even if the power-supply voltage varies, by adjusting the level of the output signal from the DC amplifier circuit 1-2 315 with the gain corresponding to the power-supply voltage. The output signal from the ratiometric amplifier 316 is outputted from the angular velocity signal output terminal Vout as an angular velocity signal.

The second synchronous detection circuit 321 performs synchronous detection of the signal from the AC amplifier circuit 304 on the basis of a detection signal having a frequency equal to that of the drive signal and having a phase substantially equal to that of the drive signal. The second low-pass filter 322 smoothes the signal from the second synchronous detection circuit 321 and also reduces the noise of the high-frequency component. The DC amplifier circuit 2-1 323 performs DC amplification of the output signal from the second low-pass filter 322. The second switched capacitor filter 324 further reduces the noise of the high-frequency component included in the output signal from the DC amplifier circuit 2-1 323 and limits the frequency band of the output signal.

The DC amplifier circuit 2-2 325 amplifies the output signal from the second switched capacitor filter 324 and decides the ultimate gain. The output signal from the DC amplifier circuit 2-2 325 is outputted from the leakage signal output terminal Vmon as a leakage signal and is also inputted to the threshold circuit 326. The threshold circuit 326 outputs, from the failure diagnosis signal output terminal DIAG, a failure diagnosis signal indicating whether a failure has occurred in the angular velocity sensor 1 or not, on the basis of the result of comparing the output signal from the second switched capacitor filter 324 with a threshold value.

Signal Processing on Leakage Signal Component in Detection Circuit

FIGS. 4A to 4I show waveforms of the leakage signal component in the detection circuit 30. FIGS. 4A to 4I show changes in the leakage signal at individual points A to I shown in FIG. 3. The horizontal axis represents time and the vertical axis represents voltage. In FIGS. 4A to 4I, angular velocity signal components are omitted and only leakage signal components are shown.

Figure 4A:
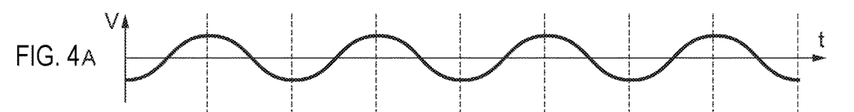
Figure 4B:
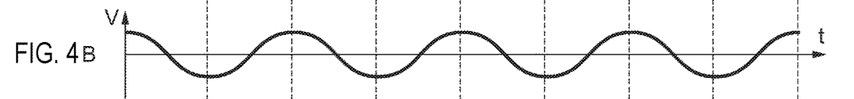

At point A (output of the first charge amplifier 301), a leakage signal component corresponding to the leakage vibration of the first detection arm 121 is outputted. At point B (output of the second charge amplifier 302), a leakage signal component corresponding to the leakage vibration of the second detection arm 122 is outputted. These leakage signal components are AC signals of the same phase as or the reverse phase of that of the drive signal outputted from the drive circuit 20.

Figure 4C:
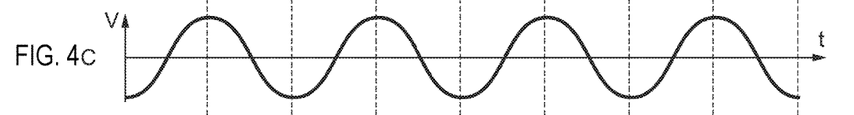

At point C (output of the AC amplifier circuit 304), a signal as a result of the differential amplification of the output signal at point A and the output signal at point B by the differential amplifier circuit 303, followed by the amplification by the AC amplifier circuit 304, is outputted.

Figure 4D:
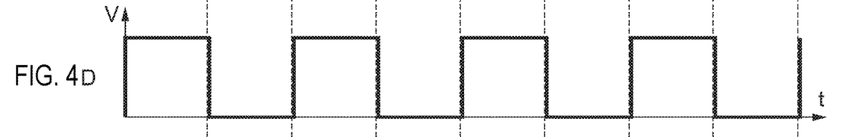

At point D (detection input of the first synchronous detection circuit 311), a first detection signal for the first synchronous detection circuit 311 to perform synchronous detection is inputted. The phase of the first detection signal is shifted substantially 90 degrees from the phase of the drive signal and the phase of the leakage signal component at point C.

Figure 4E:
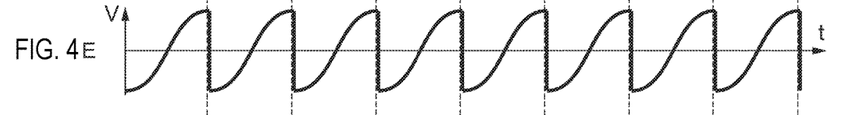

At point E (output of the first synchronous detection circuit 311), a signal as a result of multiplying the leakage signal component at point C and the first detection signal at point D is outputted. Therefore, the output signal at point E is saw-toothed, as illustrated.

Figure 4F:
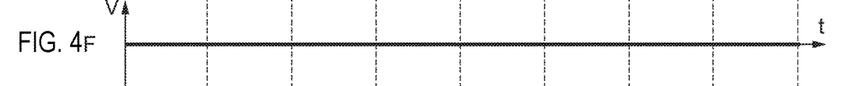

At point F (output of the ratiometric amplifier 316), a signal as a result of integrating the output signal at point E by the first low-pass filter 312 and then processing the signal through the DC amplifier circuit 1-1 313, the first switched capacitor filter 314, the DC amplifier circuit 1-2 315 and the ratiometric amplifier 316 is outputted. As the output signal at point E is integrated, the leakage signal is offset and therefore the leakage signal component does not contribute to the output signal at point F. That is, the output signal from the angular velocity signal output terminal Vout includes no leakage signal component.

Figure 4G:
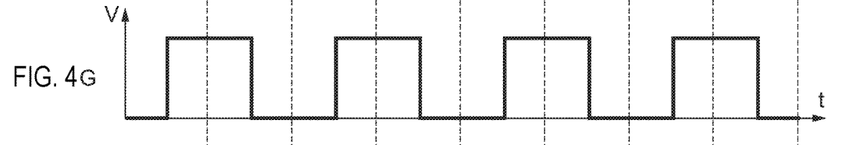

At point G (detection input of the second synchronous detection circuit 321), a second detection signal for the second synchronous detection circuit 321 to perform synchronous detection is inputted. The phase of the second detection signal is substantially equal to the phase of the drive signal and the phase of the leakage signal component at point C.

Figure 4H:
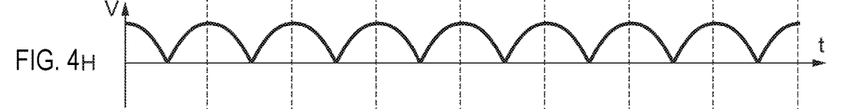

At point H (output of the second synchronous detection circuit 321), a signal as a result of multiplying the leakage signal component at point C and the second detection signal at point G is outputted. Therefore, the output signal at point H has a shape in which full-wave rectification of the leakage signal component at point C has been done, as illustrated.

Figure 4I:
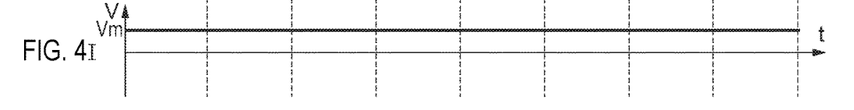

At point I (output of the DC amplifier circuit 2-2 325), a signal as a result of integrating the output signal at point H by the second low-pass filter 322 and then processing the signal through the DC amplifier circuit 2-1 323, the second switched capacitor filter 324 and the DC amplifier circuit 2-2 325 is outputted. Therefore, a leakage signal output Vm corresponding to the magnitude of the leakage vibration is outputted from the leakage signal output terminal Vmon.

Method for Inspecting Physical Quantity Sensor

Next, a method for inspecting the angular velocity sensor 1 as a physical quantity sensor according to this embodiment will be described.

The inspection of the angular velocity sensor 1 is carried out by applying a drive signal to the drive portion 11 of the angular velocity detection element 10 as a test drive signal, with the voltage level Vd of the drive signal made variable, and then measuring the leakage signal output Vm outputted from the leakage signal output terminal Vmon as a test detection signal while changing the voltage level Vd. Based on changes in the leakage signal output Vm in relation to changes in the voltage level Vd, pass/fail determination on whether the angular velocity detection element 10 is a quality product or defective product is carried out.

Specific inspection procedures will be described below.

In normal use of the angular velocity sensor 1, the AGC circuit 21 generates the drive signal on the basis of the reference voltage VREF inputted from the reference voltage circuit 22 via the reference voltage input electrode 216.

To carry out the inspection, first, the connection of the switching circuit 214 provided in the AGC circuit 21 is switched by the switching circuit control signal. This results in the state where the signal from the external voltage input electrode 215, instead of the signal from the reference voltage input electrode 216, is applied to the comparator/adjustor circuit 213.

Next, an external voltage source is connected to the external terminal VR and the variable external voltage Vex is applied. As the external voltage Vex is changed, the voltage level Vd of the drive signal outputted from the AGC circuit 21 changes accordingly. In this embodiment, at the same time as the voltage level Vd is raised from a first level Vd1 to a second level Vd2, the leakage signal output Vm from the leakage signal output terminal Vmon is measured and its changes are recorded.

Figure 5:
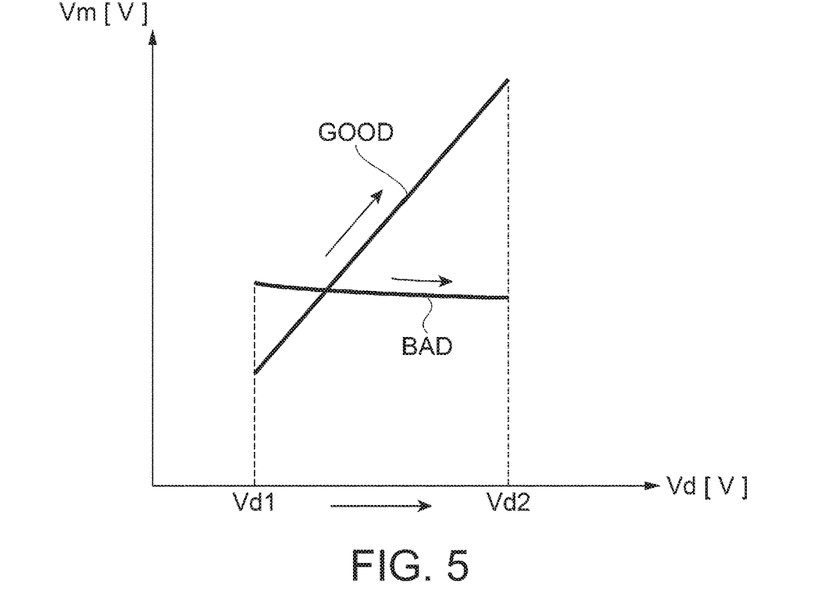
FIG. 5 is an example of a graph showing changes in leakage signal output in relation to changes in voltage level.

FIG. 5 shows an example of data obtained by the inspection method according to this embodiment. The vertical axis represents the leakage signal output Vm and the horizontal axis represents the voltage level Vd. FIG. 5 shows changes in the leakage signal output Vm when the voltage level Vd of the drive signal is raised from the first level Vd1 to the second level Vd2. "GOOD" indicates an example of data of a quality product. "BAD" indicates an example of data of a defective product with a foreign matter attached to the angular velocity detection element 10.

In the case of the quality product, when the voltage level Vd rises, the vibration amplitude of the drive portion 11 increases and therefore the leakage signal output Vm due to the asymmetry of the vibration rises as well. In the example shown in FIG. 5, the leakage signal output Vm increases substantially in proportion to the increase in the voltage level Vd.

Meanwhile, the defective product exhibits different behavior from the quality product. In the example shown in FIG. 5, even when the voltage level Vd rises, the foreign matter obstructs an increase in the vibration amplitude of the drive portion 11 and therefore no larger change is seen in the leakage signal output Vm.

Therefore, a quality product and a defective product can be discriminated from each other by calculating the rate of change in the leakage signal output in relation to the voltage level Vd, and then determining a physical quantity sensor in which the value of the rate of change falls within an allowable range, as a quality product, and determining a physical quantity sensor in which the value of the rate change falls out of the allowable range, as a defective product. For example, a reference rate of change may be decided, and a physical quantity sensor in which the rate of change falls within a range of 95 to 105% of the reference rate of change may be determined as a quality product, whereas a physical quantity sensor in which the rate of change falls out of the range may be determined as a defective product.

The inspection method is not limited to the case of discriminating a defective product with a foreign matter attached. For example, when a short circuit is generated between drive electrodes because of a stain or the like, or when a wire is disconnected, the leakage signal output exhibits different behavior from a quality product. Therefore, this can be determined as a defective product.

Also, the external voltage Vex may be continuously changed or may be discretely changed between a voltage value corresponding to the first level Vd1 and a voltage value corresponding to the second level Vd2. As the value of the external voltage Vex, for example, a rise from 1 V to 2V may be used.

While the configuration to raise the voltage level Vd is described with respect to the inspection method, it suffices that the voltage level Vd is changed monotonously. For example, pass/fail determination may be carried out on the basis of the rate of change in the leakage signal output Vm when the voltage level Vd is lowered from the second level Vd2 to the first level Vd1.

As described above, the method for inspecting the physical quantity sensor according to the embodiment can achieve the following effects.

That is, since pass/fail determination is carried out on the basis of changes in the leakage signal output Vm in relation to changes in the voltage level Vd of the drive signal, the inspection can be carried out in a shorter time than in the case where a burn-in test is conducted. Also, since changes in the output signal from the detection portion 12 in relation to changes in the drive signal applied to the drive portion 11 are examined, the physical quantity sensor can be determined as a defective product no matter which of the drive portion 11 and the detection portion 12 has a problem. Therefore, both of the drive portion 11 and the detection portion 12 can be inspected and efficient inspection can be realized.

Also, as shown in FIGS. 4A to 4I, in the circumstance where no angular velocity is applied, almost no signal corresponding to the vibration state of the angular velocity detection element 10 is outputted from the angular velocity signal output terminal Vout. Meanwhile, the leakage signal output Vm changes in relation to changes in the voltage level Vd of the drive signal, with a higher sensitivity than the output signal from the angular velocity signal output terminal Vout. Therefore, the leakage signal output Vm reflects an abnormality in the vibration state more strongly than the output signal from the angular velocity signal output terminal Vout. Thus, by examining changes in the leakage signal output Vm, more accurate pass/fail determination can be carried out than in the case where changes in the output signal from the angular velocity signal output terminal Vout are examined.

In the case where a burn-in test is conducted, the physical quantity sensor needs to be placed in a high-temperature environment over a long time and therefore damage can be left in components other than the physical quantity detection element. In contrast, with the method for inspecting the physical quantity sensor according to the embodiment, pass/fail determination on the physical quantity detection element can be carried out without damaging other components.

Also, since the voltage level Vd of the drive signal is made variable by inputting the variable external voltage Vex from outside, the voltage level Vd can be set freely. Thus, the value of the voltage level Vd and the way this value varies can be changed according to the type of the angular velocity sensor 1 and more efficient inspection can be carried out.

Embodiment 2

Next, a method for inspecting a physical quantity sensor according to Embodiment 2 will be described.

Here, the configuration of the angular velocity sensor 1 as a preferred example of a physical quantity sensor is similar to that in Embodiment 1. Also, pass/fail determination on whether the angular velocity detection element 10 is a quality product or defective product on the basis of changes in the leakage signal output Vm in relation to changes in the voltage level Vd is similar to that in Embodiment 1.

Specific procedures of the inspection method according to this embodiment will be described below.

First, as in Embodiment 1, the connection of the switching circuit 214 is switched by a switching circuit control signal. This results in the state where the signal from the external voltage input electrode 215 is applied to the comparator/adjustor circuit 213. Then, a variable external voltage Vex is applied to the external terminal VR from an external voltage source.

Next, the external voltage Vex is raised and the voltage level Vd of the drive signal outputted from the AGC circuit 21 is raised from the first level Vd1 to the second level Vd2. At the same time, the leakage signal output Vm from the leakage signal output terminal Vmon is measured and changes in the leakage signal output Vm in relation to the rise in the voltage level Vd are recorded.

Subsequently, the external voltage Vex is lowered and the voltage level Vd of the drive signal is lowered from the second level Vd2 to the first level Vd1. At the same time, the leakage signal output Vm is measured and changes in the leakage signal output Vm in relation to the fall in the voltage level Vd are recorded.

Figure 6:
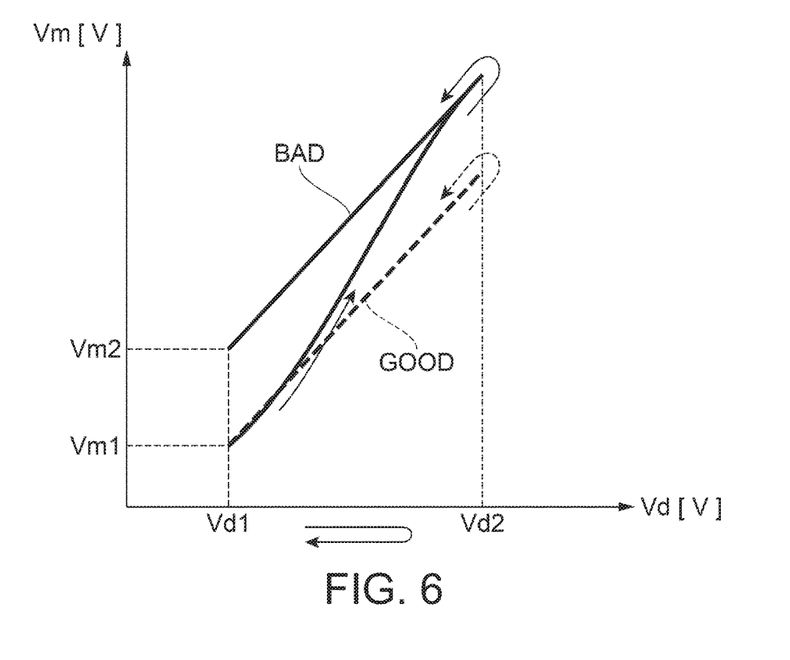
FIG. 6 is an example of a graph showing changes in leakage signal output in relation to changes in voltage level.

FIG. 6 shows a representation of data obtained by the inspection method according to the embodiment. The vertical axis represents the leakage signal output Vm and the horizontal axis represents the voltage level Vd. "GOOD" indicates an example of the leakage signal output of a quality product. "BAD" indicates an example of the leakage signal output of a defective product with a defect such as a crack on the angular velocity detection element 10.

In the case of the quality product, the leakage signal output Vm in relation to the same voltage level Vd is substantially the same when the voltage level Vd is raised and when the voltage level Vd is lowered.

Meanwhile, in the case where the angular velocity detection element 10 has a defect such as a crack, the angular velocity detection element 10 exhibits different behavior from the quality product. That is, in the process of raising the voltage level Vd from the first level Vd1 to the second level Vd2, the defect of the angular velocity detection element 10 expands and the asymmetry of the drive vibration of the drive portion 11 increases. Therefore, when the defect expands, the leakage signal output Vm changes at a higher rate than the previous rate of change. Since the expanded defect will not restore its original state even if the voltage level Vd is later lowered from the second level Vd2, a hysteresis occurs in the change in the leakage signal output Vm. Therefore, a leakage signal output Vm1 when the voltage level Vd begins to be raised from the first level Vd1, and a leakage signal output Vm2 when the voltage level Vd has finished being lowered to the first level Vd1 after being raised to the second level Vd2, have different values.

Thus, pass/fail determination on the angular velocity detection element 10 can be carried out on the basis of the difference between Vm1 and Vm2. Specifically, a physical quantity sensor in which the difference between Vm1 and Vm2 falls within an allowable range can be determined as a quality product, and a physical quantity sensor in which the difference between Vm1 and Vm2 falls out of the allowable range can be determined as a defective product. For example, in the case the value of Vm2 falls within a range of 95 to 105% of the value of Vm1, the physical quantity sensor can be determined as a quality product. Otherwise, the physical quantity sensor can be determined as a defective product.

As described above, the method for inspecting the physical quantity sensor according to the embodiment can achieve the following effects.

That is, by examining changes in the leakage signal output Vm, physical quantity sensors that have a defect such as a crack on the angular velocity detection element 10 and can potentially become defective products can be eliminated.

The leakage signal outputs Vm1 and Vm2 are not limited to the leakage signal outputs at the start and end of the change in the voltage level Vd. For example, a method such as starting to raise the voltage level Vd from Vd0 that is lower than Vd1, then measuring the leakage signal output Vm1 at the point when Vd1 is reached, then further raising the voltage level Vd to reach Vd2, subsequently lowering the voltage level Vd, then measuring the leakage signal output Vm2 at the point when the voltage level Vd has fallen to Vd1, then further lowering the voltage level Vd to Vd0, and ending the inspection, may be employed.

Also, though the voltage level Vd is first raised and then lowered in the above description, for example, a configuration in which the voltage level Vd is lowered from the second level Vd2 to the first level Vd1 and then raised to the second level Vd2 and in which the leakage signal output Vm when the lowering is started and the leakage signal output Vm when the raising is finished are compared with each other, may be employed.

Modification 1

Figure 7:
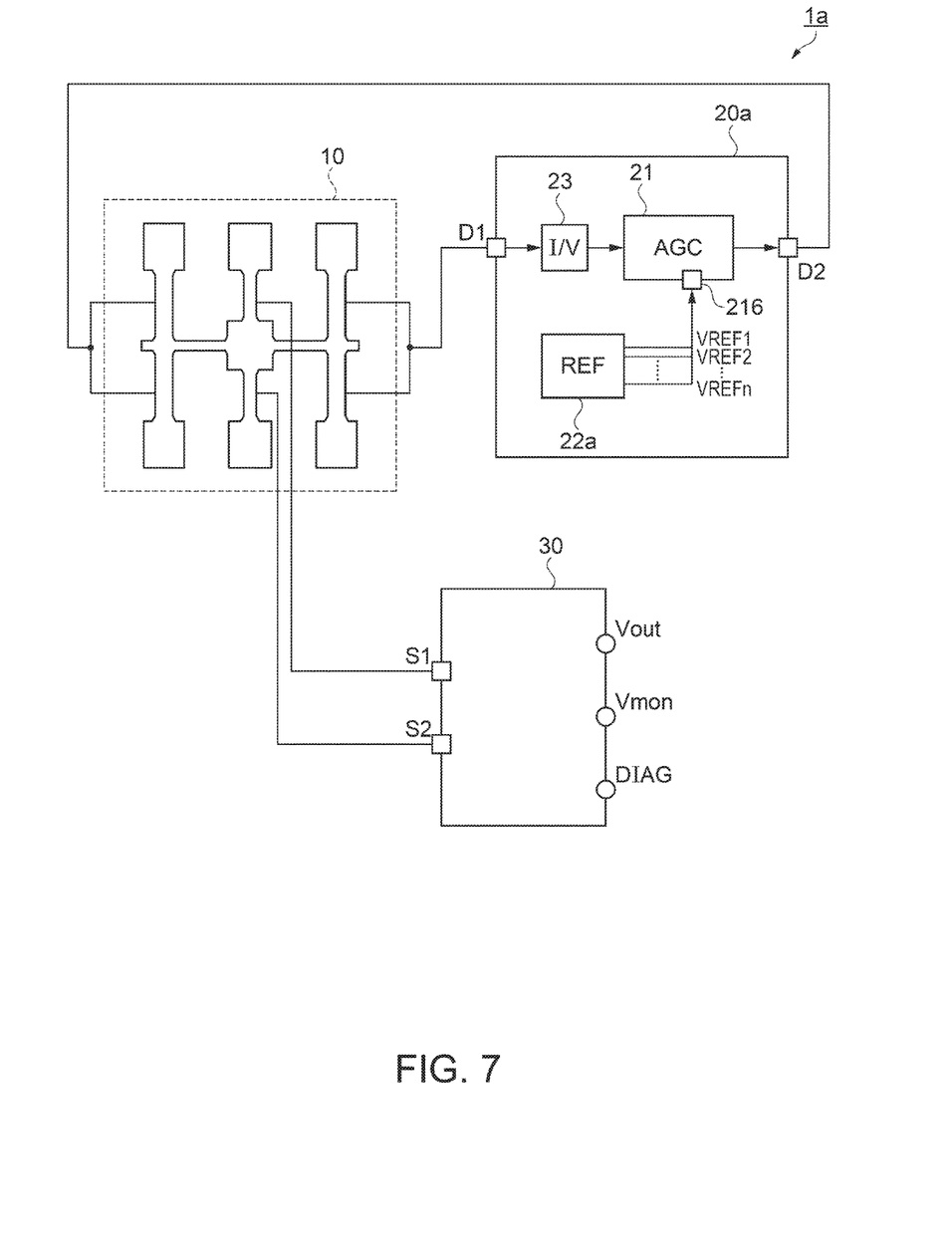
FIG. 7 is a schematic view of a physical quantity sensor according to Modification 1.

FIG. 7 is a schematic view of an angular velocity sensor 1a inspected by a method for inspecting a physical quantity sensor according to Modification 1. The same components as those in the angular velocity sensor 1 are denoted by the same reference numbers and no duplicate explanation is given.

The angular velocity sensor 1a has a drive circuit 20a. The drive circuit 20a includes the AGC circuit 21, a reference voltage circuit 22a, and the current/voltage converter circuit 23 or the like.

The reference voltage circuit 22a can generate n different types of reference voltages, from a first reference voltage VREF1 to an n-th reference voltage VREFn (n being an integer equal to or greater than 2). The n types of reference voltages generated by the reference voltage circuit 22a are inputted to the reference voltage input electrode 216 provided in the AGC circuit 21. When the first reference voltage VREF1 is inputted to the reference voltage input electrode 216, the voltage level Vd of the drive signal outputted from the AGC circuit 21 is the first level Vd1. When the n-th reference voltage VREFn is inputted to the reference voltage input electrode 216, the voltage level Vd of the drive signal outputted from the AGC circuit 21 is the second level Vd2. When the second reference voltage VREF2 to the (n-1)th reference voltage VREFn-1 are inputted to the reference voltage input electrode 216, drive signals with n-2 types of voltage levels Vd that are higher than the first level Vd1 and lower than the second level Vd2 are outputted from the AGC circuit 21.

When carrying out inspection, for example, a trigger signal is inputted from outside and the n types of reference voltages from the first reference voltage VREF1 to the n-th reference voltage VREFn are sequentially inputted from the reference voltage circuit 22a to the AGC circuit 21. Then, by measuring the value of the leakage signal output Vm when each reference voltage is inputted, changes in the leakage signal output Vm in relation to changes in the voltage level Vd can be examined.

As described above, the method for inspecting the physical quantity sensor according to this modification can achieve the following effects.

That is, since the voltage level Vd of the drive signal can be made variable by inputting n types of reference voltages from the reference voltage circuit, no external voltage source is required and inspection can be carried out with a simple configuration.

Modification 2

Figure 8:
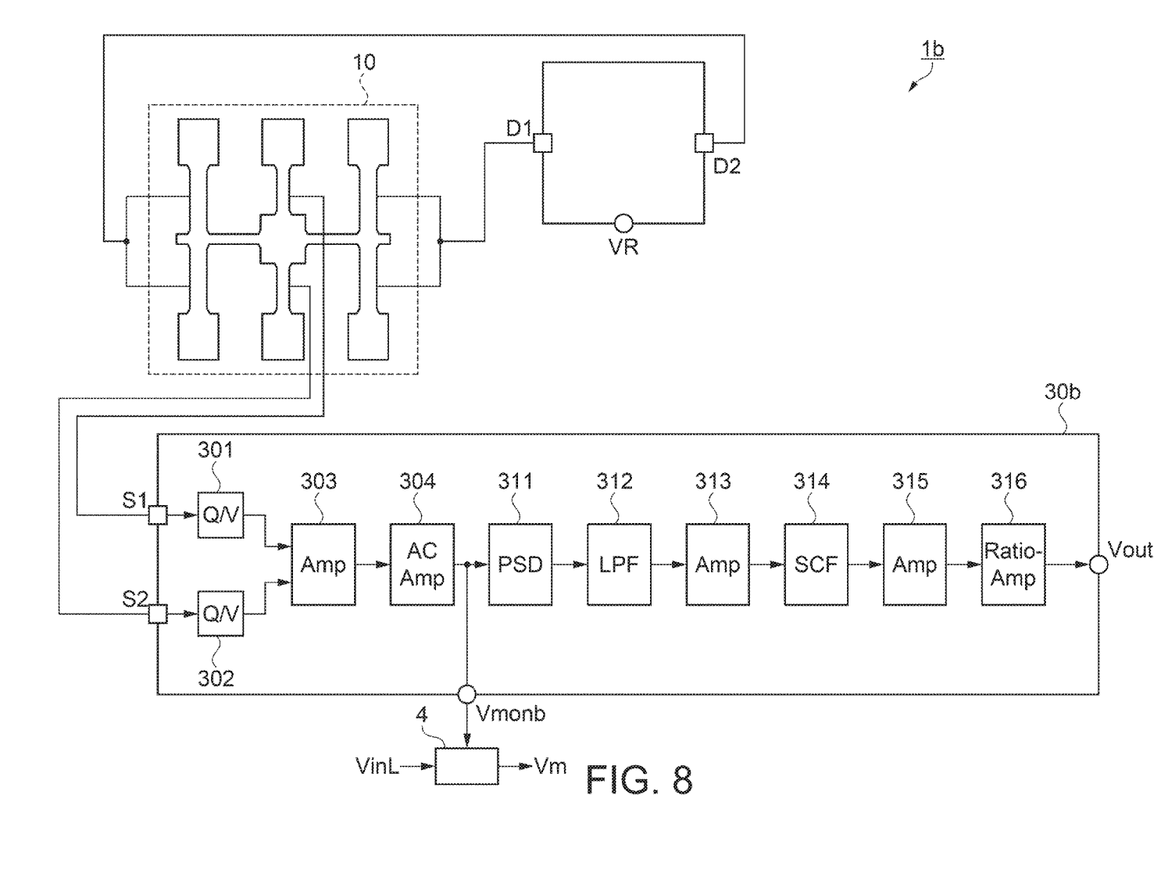
FIG. 8 is a schematic view of a physical quantity sensor according to Modification 2.

FIG. 8 is a schematic view of an angular velocity sensor 1b inspected by a method for inspecting a physical quantity sensor according to Modification 2. The same components as those in the angular velocity sensor 1 are denoted by the same reference numbers and no duplicate explanation is given.

The angular velocity sensor b1 has a detection circuit 30b. The detection circuit 30b includes the first detection electrode S1, the second detection electrode S2, the first charge amplifier 301, the second charge amplifier 302, the differential amplifier circuit 303, the AC amplifier circuit 304, the first synchronous detection circuit 311, the first low-pass filter 312, the DC amplifier circuit 1-1 313, the first switched capacitor filter 314, the DC amplifier circuit 1-2 315, the ratiometric amplifier 316, the angular velocity signal output terminal Vout, and a leakage signal output terminal Vmonb or the like.

From the leakage signal output terminal Vmonb, the signal from the AC amplifier circuit 304 is outputted. In this modification, a lock-in amplifier 4 is used in order to detect a leakage signal component. By performing lock-in detection of the output signal from Vmonb on the basis of a reference signal generated from the drive signal, a leakage signal component Vm can be detected. Thus, changes in the leakage signal component Vm in relation to changes in the voltage level Vd can be examined.

As described above, the method for inspecting the physical quantity sensor according to this modification can achieve the following effects.

That is, since the leakage signal component is detected by the lock-in amplifier 4 without providing a circuit configuration for detecting a leakage signal component in the detection circuit 30b, the configuration of the angular velocity sensor 1b can be simplified and its manufacturing cost can be restrained.

Embodiment 3

Method for Manufacturing Physical Quantity Sensor

Figure 9:
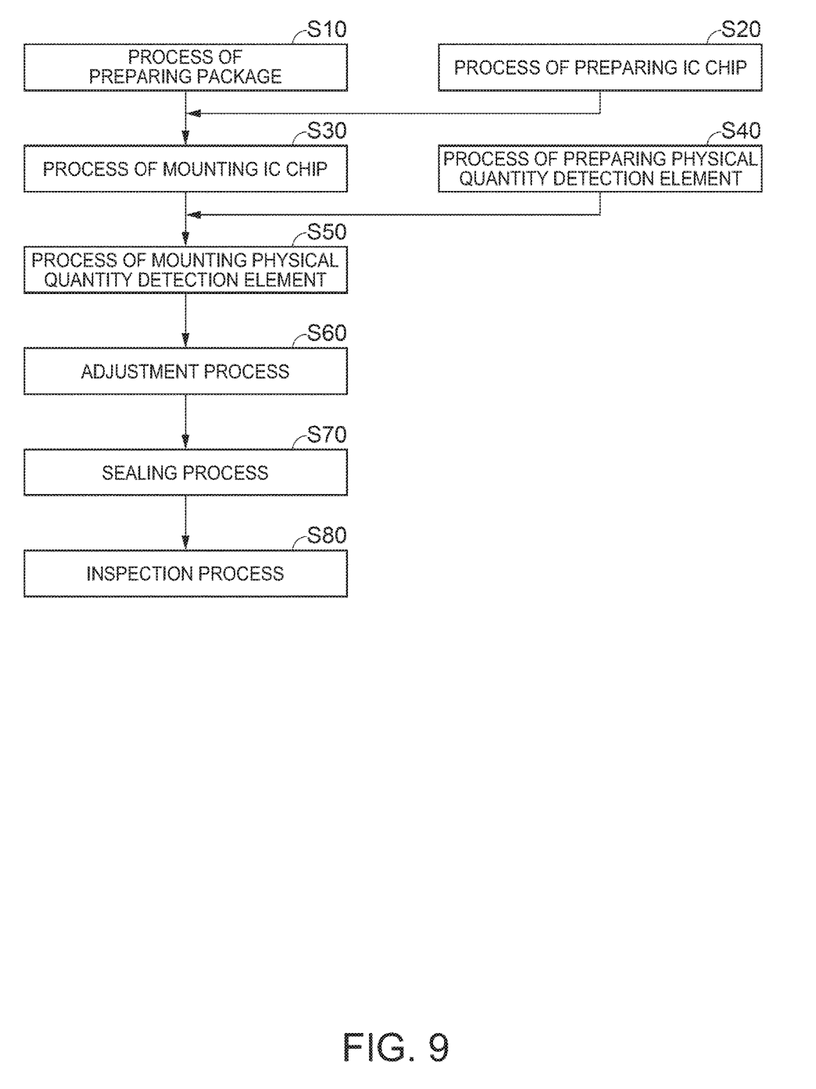
FIG. 9 shows a process of manufacturing a physical quantity sensor.

FIG. 9 shows a process of manufacturing a physical quantity sensor.

Step S10 is a process of preparing a package for accommodating a physical detection element and an IC chip. The package is substantially in the shape of a rectangular parallelepiped and includes a main body portion and a lid portion or the like which are made of a ceramic material. In the main body portion, a recess portion for accommodating a physical quantity detection element and an IC chip is provided. The lid portion includes a brazing material for sealing the main body portion or the like.

Step S20 is a process of preparing an IC chip. The IC chip is formed from a semiconductor substrate of silicon or the like and includes the drive circuit 20 (20a) and the detection circuit 30 (30b) or the like.

Step S30 is a process of mounting the IC chip. The IC chip is placed in the main body portion of the package, and in a preferred example, is electrically connected to an electrode provided in the main body portion by wire bonding.

Step S40 is a process of preparing a physical quantity detection element. In a preferred example, the physical quantity detection element is the angular velocity detection element 10. Its outer shape and electrode are formed by performing a process of photolithography or wet etching on a quartz crystal substrate.

Step S50 is a process of mounting the physical quantity detection element. The physical quantity detection element is arranged on a tab tape arranged above the IC chip and is supported by the tab tape and electrically connected to the IC chip.

Step S60 is an adjustment process. The physical quantity detection element is irradiated with a laser so as to adjust the weight of the vibrating part. Thus, resonance frequency and leakage signal output are adjusted.

Step S70 is a sealing process. The main body portion of the package is sealed by the lid portion.

Step S80 is an inspection process. Pass/fail determination on the physical quantity detection element is carried out by the inspection described in Embodiments 1 and 2 and Modifications 1 and 2.

As described above, the method for manufacturing the physical quantity sensor according to this embodiment can achieve the following effects.

That is, since inspection based on changes in the leakage signal output Vm in relation to changes in the voltage level Vd of the drive signal is carried out in Step S80, the inspection process can be finished in a shorter time than in the case where a burn-in test is conducted. Therefore, a more efficient manufacturing method can be provided.

Although preferred embodiments and modifications have been described, the invention can be carried out with various modifications or changes to the embodiments and modifications within the technical scope of the invention.

In the embodiments and modifications, the angular velocity sensor 1 (1a, 1b) is used as an example of the physical quantity sensor. However, the physical quantity sensor according to an aspect of the invention may be any sensor which detects a physical quantity on the basis of the vibration of a detection portion. For example, an acceleration sensor or pressure sensor using a vibrator may be employed.

In the embodiments and modifications, the angular velocity detection element 10 is a so-called double-T type. However, a tuning fork-type vibrator having two vibrating arms extending in parallel from a base portion may be employed. Also, a so-called H-type vibrator which has two drive arms extending in parallel from a base portion and two detection arms extending in parallel from the base portion into the opposite direction to the drive arms may be employed. Moreover, a capacitance detection-type vibrator having an inter digital transducer may be employed.

Also, while the angular velocity detection element is described as being made of quartz crystal in the embodiments and modifications, the angular velocity detection element 10 may be made of silicon single crystal, for example.

The entire disclosure of Japanese Patent Application No. 2015-074861, filed Apr. 1, 2015 is expressly incorporated by reference herein.

What is claimed is:

1. A method for inspecting a physical quantity sensor, the method comprising:
    applying a test drive signal, while changing a voltage level, to a physical quantity detection element having a detection portion which performs detection vibration according to a physical quantity;
    detecting a leakage signal from the detection portion corresponding to the test drive signal, as a test detection signal, the leakage signal being a signal generated in the detection portion when there is no Coriolis force applied to the detection portion; and
    performing a pass/fail determination based on a change in the test detection signal in relation to the change in the voltage level.

2. The method for inspecting the physical quantity sensor according to claim 1, wherein the physical quantity detection element further includes a drive portion which performs drive vibration as the test drive signal is applied thereto, and
    the leakage signal is generated on the basis of the drive vibration of the drive portion.

3. The method for inspecting the physical quantity sensor according to claim 2, wherein the pass/fail determination is performed on the basis of a rate of change in voltage of the test detection signal in relation to the voltage level when the voltage level is raised from a first level to a second level that is higher than the first level.

4. The method for inspecting the physical quantity sensor according to claim 2, wherein the voltage level is raised from a first level to a second level that is higher than the first level,
    the voltage level is lowered from the second level to the first level, and
    the pass/fail determination is performed on the basis of a difference between a voltage of the test detection signal when the voltage level rises from the first level and a voltage of the test detection signal when the voltage level has fallen to the first level.

5. The method for inspecting the physical quantity sensor according to claim 2, wherein the physical quantity sensor further includes a drive circuit which causes the drive portion to perform the drive vibration, and
the drive circuit generates the test drive signal on the basis of a variable external voltage inputted from outside.

6. The method for inspecting the physical quantity sensor according to claim 2, wherein the physical quantity sensor further includes a drive circuit which causes the drive portion to perform the drive vibration,
the drive circuit has a reference voltage circuit configured to generate n different kinds of reference voltages from a first reference voltage to an n-th reference voltage (n being an integer equal to or greater than 2), and
the voltage level of the test drive signal is based on the reference voltages.

7. The method for inspecting the physical quantity sensor according to claim 1, wherein the pass/fail determination is performed on the basis of a rate of change in voltage of the test detection signal in relation to the voltage level when the voltage level is raised from a first level to a second level that is higher than the first level.

8. The method for inspecting the physical quantity sensor according to claim 1, wherein the voltage level is raised from a first level to a second level that is higher than the first level,
the voltage level is lowered from the second level to the first level, and
the pass/fail determination is performed on the basis of a difference between a voltage of the test detection signal when the voltage level rises from the first level and a voltage of the test detection signal when the voltage level has fallen to the first level.

9. A method for manufacturing a physical quantity sensor, the method comprising:
preparing a package for accommodating a physical quantity detection element and an IC chip, the physical quantity detection element having a detection portion which performs detection vibration according to a physical quantity;
forming the IC chip from a semiconductor substrate;
mounting the physical quantity detection element above the IC chip and in electrical connection with the IC chip; and
an inspection process including:
applying a test drive signal, while changing a voltage level, to a physical quantity detection element;
detecting a leakage signal from the detection portion corresponding to the test drive signal, as a test detection signal, the leakage signal being a signal generated in the detection portion when there is no Coriolis force applied to the detection portion; and
performing a pass/fail determination based on a change in the test detection signal in relation to the change in the voltage level.

10. The method for manufacturing the physical quantity sensor according to claim 9, wherein the physical quantity detection element further includes a drive portion which performs drive vibration as the test drive signal is applied thereto, and
the leakage signal is generated on the basis of the drive vibration of the drive portion.

11. The method for manufacturing the physical quantity sensor according to claim 10, wherein the pass/fail determination is performed on the basis of a rate of change in voltage of the test detection signal in relation to the voltage level when the voltage level is raised from a first level to a second level that is higher than the first level.

12. The method for manufacturing the physical quantity sensor according to claim 10, wherein the voltage level is raised from a first level to a second level that is higher than the first level,
the voltage level is lowered from the second level to the first level, and
the pass/fail determination is performed on the basis of a difference between a voltage of the test detection signal when the voltage level rises from the first level and a voltage of the test detection signal when the voltage level has fallen to the first level.

13. The method for manufacturing the physical quantity sensor according to claim 10, wherein the physical quantity sensor further includes a drive circuit which causes the drive portion to perform the drive vibration, and
the drive circuit generates the test drive signal on the basis of a variable external voltage inputted from outside.

14. The method for manufacturing the physical quantity sensor according to claim 10, wherein the physical quantity sensor further includes a drive circuit which causes the drive portion to perform the drive vibration,
the drive circuit has a reference voltage circuit configured to generate n different kinds of reference voltages from a first reference voltage to an n-th reference voltage (n being an integer equal to or greater than 2), and
the voltage level of the test drive signal is based on the reference voltages.

15. The method for manufacturing the physical quantity sensor according to claim 9, wherein the pass/fail determination is performed on the basis of a rate of change in voltage of the test detection signal in relation to the voltage level when the voltage level is raised from a first level to a second level that is higher than the first level.

16. The method for manufacturing the physical quantity sensor according to claim 9, wherein the voltage level is raised from a first level to a second level that is higher than the first level,
the voltage level is lowered from the second level to the first level, and
the pass/fail determination is performed on the basis of a difference between a voltage of the test detection signal when the voltage level rises from the first level and a voltage of the test detection signal when the voltage level has fallen to the first level.

* * * * *